No. 804,921. PATENTED NOV. 21, 1905.
A. H. BLACKBURN.
SOOT SCRAPER.
APPLICATION FILED NOV. 3, 1903.

2 SHEETS—SHEET 1.

Witnesses:
Thomas J. Byrnes
S. A. Dunham

Inventor:
Arthur H. Blackburn by Kerr, Page & Cooper, Att'ys.

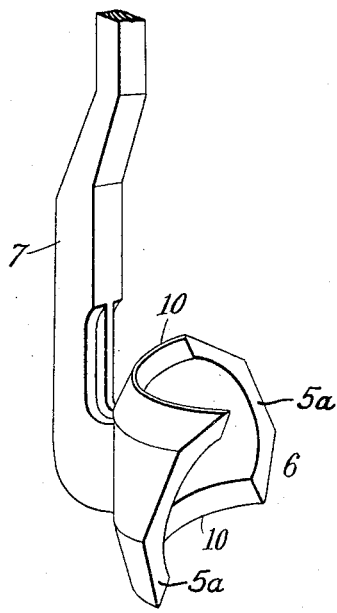

UNITED STATES PATENT OFFICE.

ARTHUR H. BLACKBURN, OF MATTEAWAN, NEW YORK.

SOOT-SCRAPER.

No. 804,921.  Specification of Letters Patent.  Patented Nov. 21, 1905.

Application filed November 3, 1903. Serial No. 179,688.

*To all whom it may concern:*

Be it known that I, ARTHUR H. BLACKBURN, a subject of the King of Great Britain, residing at Matteawan, county of Dutchess, State of New York, have invented certain new and useful Improvements in Soot-Scrapers, of which the following is a specification reference being had to the drawings accompanying and forming part of the same.

My invention relates to reciprocating scrapers for removing soot from the tubes of steam-boilers, water-heaters, fuel-economizers, and the like, and has for its object to provide a more efficient device of this character, which shall be simple and inexpensive.

To these ends it consists of the novel features hereinafter described, and more particularly set forth in the claim.

Figure 1:
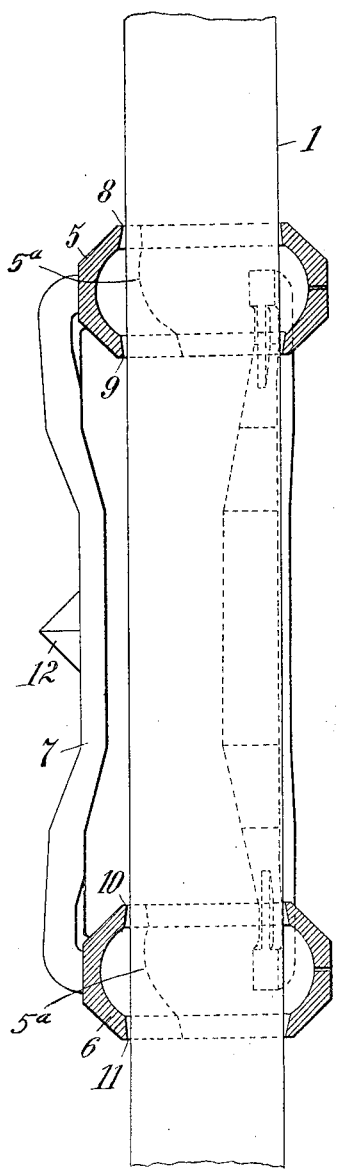
Figure 2:
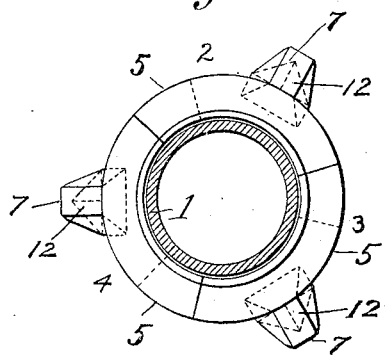

Referring to the drawings for a more ready understanding of the invention, Figure 1 shows a convenient embodiment of the same, partly in section, arranged for use upon a tube. Fig. 2 is an end view of the same, the tube being shown in section. Fig. 3 is a perspective view of a detail of the device, showing the connection of parts thereof.

The pipe on which the scraper is to be used is indicated by 1. The scraper itself consists of a plurality of sections, preferably three in number, 2, 3, and 4. Each section comprises a pair of cutters 5 6, one being arranged at each end of a connector or bar 7. The cutters are segments of a ring, as appears in Fig. 2, concaved on the inside the better to form the cutting or scraping edges 8, 9, 10, and 11, the outside conforming generally to the inner contour, as shown in Fig. 1. The cutter-segments are beveled at their ends, as shown more clearly at $5^a$, Fig. 3, to provide against vertical displacement of the parts when the assembled device is reciprocated by mechanism engaging the lugs or projections 12.

Instead of joining the connector to the segments near the inner cutting edges the union is made approximately midway between the inner and outer edges, and the connector is made to curve inward toward the tube, as shown in Fig. 1. By this arrangement a considerable space is left between the inner cutting edges 9 10 and the bar. In scrapers of the old type the bar was connected near the edges, as before mentioned; but this presents a disadvantage in that the shallow cutting edge at that point left a streak of soot on the tube, since it was impossible to make the cutting-angle there sufficiently acute to effect a clean scrape. In my improved device, however, the clearance of the edge by the connector, leaving the space shown between the two parts, renders it possible to dress the cutting edge to any angle desired throughout the whole length of the segment instead of merely on each side of the connector.

The device also differs from the ordinary scraper in that two cutting edges on each segment may be employed, as shown, if desired, so that the pipe is cleaned when the device moves in both directions, whereas heretofore the scraping has been effected only when the scraper moves in one direction, usually downward. The economy of time thus secured in completely cleaning the tube is considerable.

Having now fully described my invention, what I claim as new, and desire to secure by Letters Patent, is—

In a soot-scraper composed of a plurality of sections a section consisting of a pair of ring-segments, each segment being concave on the inside to form two cutting edges adapted to bear on the outer surface of a pipe or tube, and a bar connecting the segments, secured to each on the outside approximately midway between the cutting edges, as and for the purposes set forth.

Signed this 31st day of October, 1903.

ARTHUR H. BLACKBURN.

In presence of—
 H. C. DUFF,
 M. H. KEATING.